United States Patent

[11] 3,622,596

[72] Inventors Rudolf Fischer
Kehrsatz, near Berne;
Rudolf Hirt, Muri, near Berne, both of Switzerland
[21] Appl. No. 677,031
[22] Filed Oct. 23, 1967
[45] Patented Nov. 23, 1971
[73] Assignee Dr. A. Wander, S. A.
Berne, Switzerland
[32] Priority Oct. 14, 1960
[33] Switzerland
[31] 11,547/60 Mar. 9, 1962, 2880/62
Continuation-in-part of application Ser. No. 263,395, Mar. 7, 1963, now abandoned, which is a continuation-in-part of application Ser. No. 144,294, Oct. 11, 1961, now abandoned. This application Oct. 23, 1967, Ser. No. 677,031

[54] CARBANILIDE COMPOUNDS
17 Claims, No Drawings
[52] U.S. Cl. ................................................ 260/309.6,
260/157, 260/240 D, 260/240 E, 260/256.4 H, 260/294.9, 260/295 PA, 260/295 E, 260/295 K, 260/465 D, 260/552 R, 260/553 A, 260/553 C, 260/558 A, 260/558 S, 260/559 A, 424/273
[51] Int. Cl. ......................................................... C07d 49/34
[50] Field of Search ........................................... 260/559 A,
559 S, 240 CA, 240 D, 256.4, 309.6, 558 A, 553 A, 553 C, 295 U, 295 AM

[56] References Cited
UNITED STATES PATENTS
| | | | |
|---|---|---|---|
| 1,210,751 | 1/1917 | Anderwert et al. | 260/553 |
| 2,438,200 | 3/1948 | Behr et al. | 260/561 |
| 2,508,860 | 5/1950 | Grimmel et al. | 260/518 |
| 2,832,739 | 4/1958 | Swakon | 260/553 |

FOREIGN PATENTS
| | | | |
|---|---|---|---|
| 334,316 | 1/1959 | Switzerland | 260/347.3 |

OTHER REFERENCES
Adams et al. Jour. Amer. Chem. Soc. Vol. 60, Pages 1489–1491 (1938). QD1.A5
Kaufler et al. Vol. 40, Pages 3261– 3262 (1907). QD1.D4

Primary Examiner—Natalie Trousoe
Attorney—Hibben, Noyes and Bicknell

ABSTRACT: Carbanilide compounds which exhibit tuberculostatic, trypanocidal, antibabesial, antileukaemic and herbicidal properties, and which have the following formula:

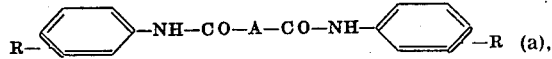

wherein A stands for m- or p-phenylene, $R_1$-substituted m- or p-phenylene, m- or p-phenyleneamino, m- or p-phenylenediamino $R_1$-substituted m- or p-phenylenediamino, p-styrylene, p-phenylenedivinylene, vinylenedi-p-phenylene, or m- or p-pyridylene, $R_1$ denoting halogen, amino, nitro, hydroxy, lower alkyl, lower alkoxy, lower alkylthio, lower alkanoyl amino, or lower mono- or dialkylaminocarbonyl; and R are the same or different residues of one of the formulae:

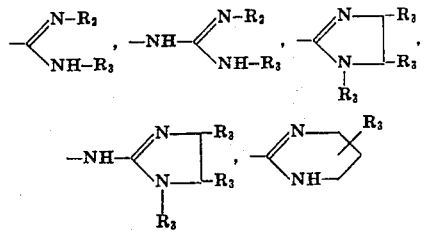

$R_2$ denoting hydrogen, alkyl having from one to five carbon atoms, or alkoxyalkyl having from one to five carbon atoms, and $R_3$ being the same or different members of the group consisting of hydrogen, methyl, and ethyl; and (b) the therapeutically acceptable acid addition salts of (a).

CARBANILIDE COMPOUNDS

This is a continuation-in-part application of our copending Pat. applications Ser. No. 144,294, filed on Oct. 11, 1961, and Ser. No. 263,395, filed on Mar. 7, 1963, the latter being in turn a continuation-in-part application of the former patent application both applications now abandoned.

The invention relates generally to a class of new therapeutically useful substances. More specifically the invention relates to the class of chemical compounds consisting of (a) basic compounds of the formula:

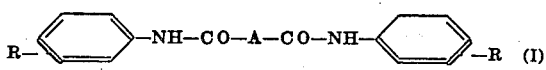

and (b) therapeutically acceptable acid addition salts thereof.

In formula I, A has the meaning of a member of the following class of divalent residues: m- and p-phenylene, $R_1$-substituted m- and p-phenylene, m- and p-phenyleneamino, m- and p-phenylenediamino, $R_1$-substituted m- and p-phenylenediamino, p-styrylene, p-phenylenedivinylene, vinylenedi-p-phenylene, and m- and p-pyridylene, $R_1$ denoting a substituent of the group consisting of halogen, amino, nitro, hydroxy, lower alkyl, lower alkoxy, lower alkylthio, lower alkanoylamino, and lower mono- and dialkylamino-carbonyl.

The symbols R in formula I denote the same or different members of the class consisting of basic residues having one of the following formulas:

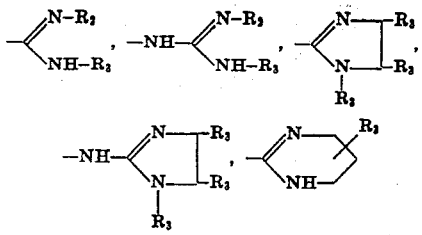

wherein $R_2$ is a member of the group consisting of hydrogen, straight or branched alkyl having from one to five carbon atoms, and alkoxyalkyl having from one to five carbon atoms totally; and the symbols $R_3$ denote the same or different members of the group consisting of hydrogen, methyl, and ethyl. It should be noted that $R_2$ and $R_3$ in the above amidine formulas are interchangeable without alteration of the identity of the compound.

In the foregoing formula I and hereinafter the symbol

is used to represent attachment of the substituent group at either the meta- or para- position of the benzene ring.

Subgeneric groups of compounds within the generic class of chemical compounds defined by formula I are as follows:

A chemical compound of the class consisting of (a) basic compounds of the formula selected from the group consisting of:

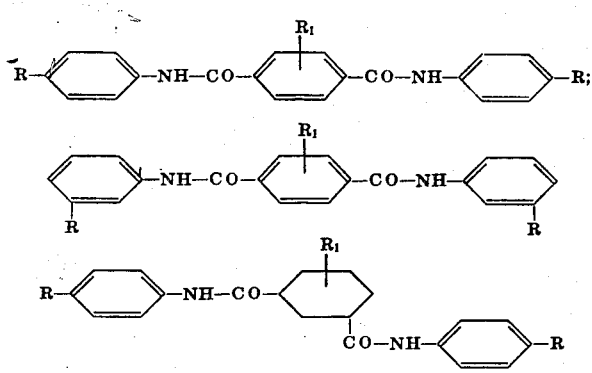

and

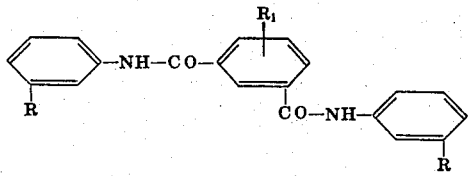

wherein $R_1$ denotes a substituent of the group consisting of halogen, amino, nitro, hydroxy, lower alkyl, lower alkoxy, lower alkylthio, lower alkanoylamino, and lower mono- and dialkylamino-carbonyl; and wherein R are the same and are selected from the class consisting of basic residues of the formulas:

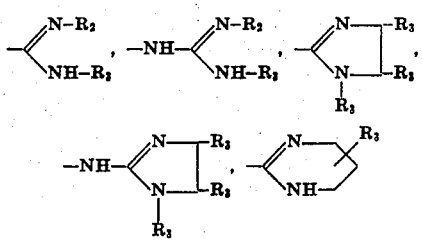

$R_2$ being a member of the group consisting of hydrogen, alkyl of from one to five carbon atoms, and alkoxyalkyl of from one to five carbon atoms, and $R_3$ being the same or different members of the group consisting of hydrogen, methyl, and ethyl; and (b) therapeutically acceptable acid addition salts of (a).

A chemical compound of the class consisting of (a) basic compounds of the formula selected from the group consisting of:

and

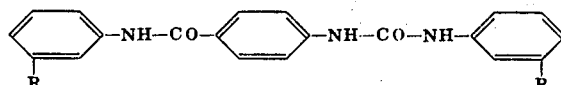

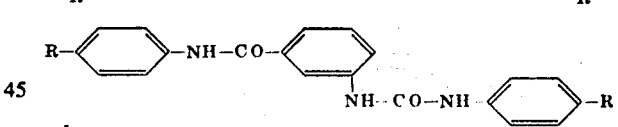

and

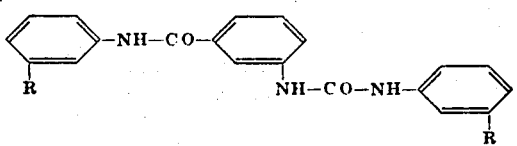

wherein R are the same and are selected from the class consisting of basic residues of the formulas:

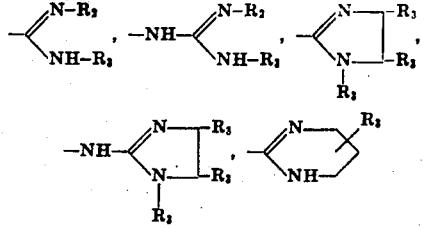

$R_2$ being a member of the group consisting of hydrogen, alkyl of from one to five carbon atoms, and alkoxyalkyl of from one to five carbon atoms, and $R_3$ being the same or different members of the group consisting of hydrogen, methyl, and ethyl; and (b) therapeutically acceptable acid addition salts of (a).

A chemical compound of the class consisting of (a) basic compounds of the formula selected from the group consisting of:

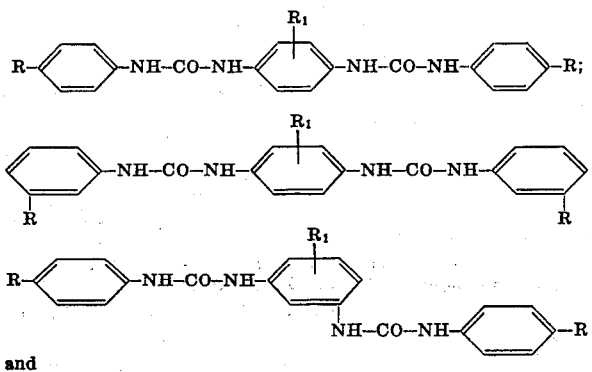

and

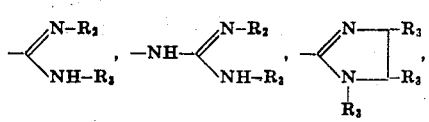

wherein $R_1$ denotes a substituent of the group consisting of halogen, amino, nitro, hydroxy, lower alkyl, lower alkoxy, lower alkylthio, lower alkanoylamino, and lower mono- and dialkylamino-carbonyl; and wherein R are the same and are selected from the class consisting of basic residues of the formulas:

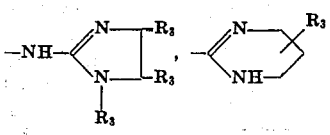

$R_2$ being a member of the group consisting of hydrogen, alkyl of from one to five carbon atoms, and alkoxyalkyl of from one to five carbon atoms, and $R_3$ being the same or different members of the group consisting of hydrogen, methyl, and ethyl; and (b) therapeutically acceptable acid addition salts of (a).

A chemical compound of the class consisting of (a) basic compounds of the formula:

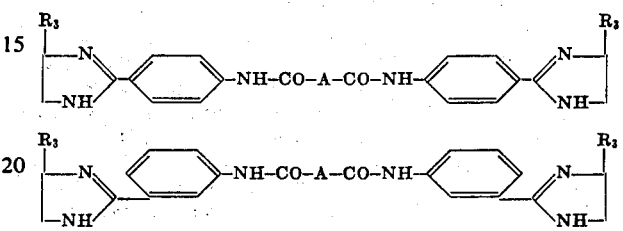

wherein A is a member of the class consisting of m- and p-phenylene, $R_1$-substituted m- and p-phenylene, m- and p-phenyleneamino, m- and p-phenylenediamino, and $R_1$-substituted m- and p-phenylenediamino, $R_1$ denoting a substituent of the group consisting of halogen, amino, nitro, hydroxy, lower alkyl, lower alkoxy, lower alkylthio, lower alkanoylamino, and lower mono- and dialkylamino-carbonyl, and $R_3$ being the same or different members of the group consisting of hydrogen, methyl, and ethyl; and (b) therapeutically acceptable acid addition salts of (a).

Preferred compounds within the scope of this invention are, for instance, those of the formulas:

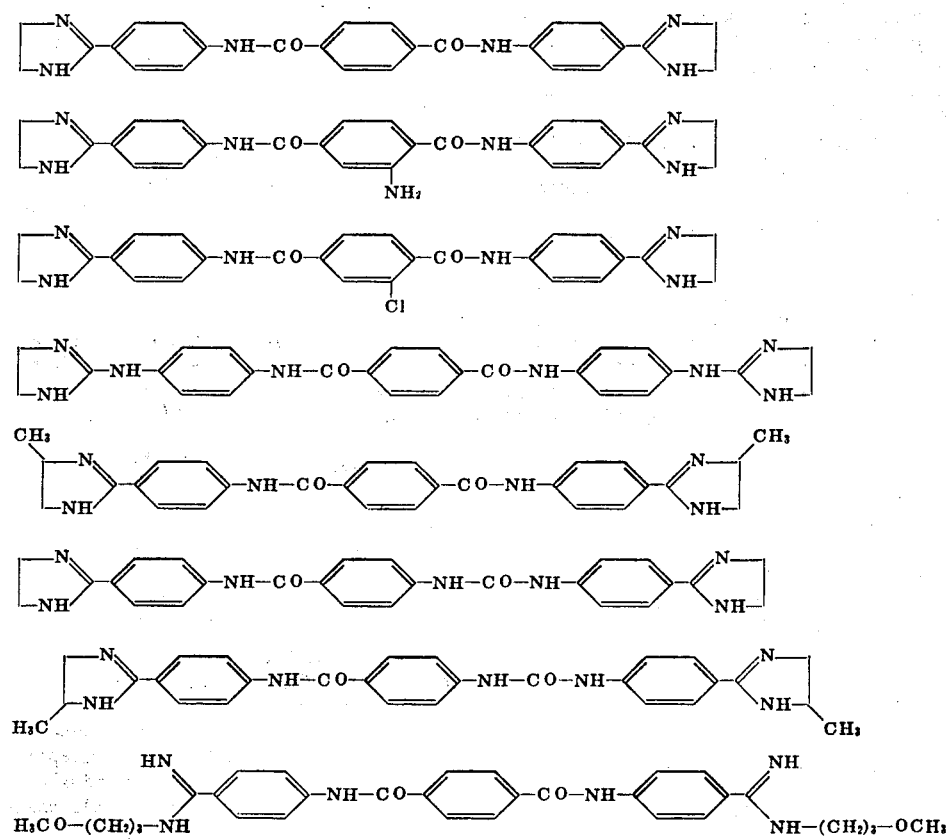

and the therapeutically acceptable acid addition salts thereof. The compounds have been found to exhibit a strong growth-inhibiting action on one or more of the following micro-organisms: Mycobacterium tuberculosis, Trypanosoma brucei, Trypanosoma congolense, and Babesia rodaini, and/or to prolong the survival time of animals suffering from leukemia caused by the strain L-1210 as shown in the accompanying table I.

The tuberculostatic action of the compounds of this invention was determined in vitro by measurement of the lowest molar concentration (molecular weight in mg./ml.) of the active substance capable of inhibiting the growth of Mycobacterium tuberculosis. The results obtained are set forth in the second column of table I below, the numerical values denoting the negative logarithm of the molar concentration.

The trypanocidal and/or antibabesial actions were determined by first injecting intraperitoneally a certain quantity of blood obtained from a mouse suffering from trypanosomiasis or babesiosis, respectively, to a group of healthy mice, said quantity being sufficient to cause the death of the untreated mice within 6 to 7 days, and then injecting subcutaneously one or several single doses of a solution or suspension of the substance to be tested, repeated doses being administered on subsequent days. The doses and test results are set forth in the third to fifth columns of table I below, the symbols used denoting:

+, prolonged survival time or recovery of part of the treated animals (death of half the number of the test animals 10 days after that of the controls);

++, immunization, few parasites detectable 4 weeks after the infection; and

+++, no parasites 4 weeks after the infection, complete recovery of all test animals.

The antileukemic action was determined by daily administering intravenously or intraperitoneally quantities of the test substances ranging from about 1 to 500 mg./kg. to groups of mice in which leukemia had been induced artificially by transfer of cancer cells of the strain L-1210. The data given in column 6 of table I below denote the survival time of the treated animals expressed as percentage of the survival time of the untreated controls, the latter time being taken as 100 percent. The active substance was injected in the form of an aqueous solution or suspension.

The results of the tests mentioned above are summarized in the table I with reference to the compounds of the subsequent examples.

Besides their therapeutic utility some of the compounds such as, for instance, the product of example 9, have also valuable herbicidal properties.

TABLE I

| 1 | 2 | 3 Trypanocidal action | | 4 | | 5 Anti-babesial action | | 6 Anti-leukaemic action | |
|---|---|---|---|---|---|---|---|---|---|
| | | T. brucei | | T. congolense | | | | | Survival |
| Product according to Ex. Nos.— | Tuberculostatic action | Dose, mg./kg. s.c. | Effect | Dose, mg./kg. s.c. | Effect | Dose, mg./kg. s.c. | Effect | Dose i.p., mg./kg./day | time, percent |
| 1, 2 | 5.3 | 4×0.5 | +++ | 4×0.5 | ++ | 4×20 | ++ | 25 | 327 |
| 3 | 4.3 | 2×5 | +++ | | | | | 165 | 196 |
| 4 | 6.1 | | | | | | | | |
| 5 | 4.3 | | | | | | | 240 | 233 |
| 6 | 6.0 | | | | | | | 5.5 | 250 |
| 7 | 5.6 | | | | | | | 10 | 350 |
| 8 | 5.8 | 4×0.5 | +++ | 4×0.5 | ++ | | | 20 | 400 |
| 9 | 6.6 | | | | | | | | |
| 10 | 6.8 | | | | | | | | |
| 11 | 6.1 | | | | | | | | |
| 12 | 6.0 | | | | | | | | |
| 13 | 5.2 | | | | | | | | |
| 14 | 5.8 | 2×5 | ++ | | | | | 30 | 380 |
| 15 | 5.5 | | | | | | | 315 | 250 |
| 16 | 5.7 | | | | | | | 768 | 268 |
| 17 | 6.1 | 2×5 | ++ | | | | | 64 | 249 |
| 18 | 5.4 | 2×5 | + | | | | | | |
| 19 | 6.8 | | | | | | | 120 | 172 |
| 20 | 5.4 | 2×5 | +++ | | | | | | |
| 21 | 5.2 | | | | | | | | |
| 22 | 5.1 | | | | | | | 5 | 293 |
| 23 | 6.7 | 4×0.5 | +++ | 4×0.5 | ++ | | | 30 | 180 |
| 24 | 5.7 | | | | | | | | |
| 25 | 5.9 | 2×5 | ++ | | | | | | |
| 26 | 4.0 | 2×5 | +++ | | | | | 15 | 200 |
| 27 | 6.0 | | | | | | | 1 | 200 |
| 28 | 7.0 | 2×5 | +++ | 2×5 | + | 1×20 | ++ | 3 | 155 |
| 29 | 7.0 | 2×5 | + | | | | | 8 | 175 |
| 30 | 7.0 | | | | | | | 62 | 157 |
| 31 | 7.2 | 2×5 | + | | | 3×5 | ++ | 10 | 290 |
| 32 | 6.4 | 4×0.5 | +++ | 4×0.5 | +++ | | | 4 | 280 |
| 33 | 6.8 | 2×5 | +++ | 2×5 | +++ | 2×50 | +++ | 25 | 179 |
| 34 | 7.4 | | | | | | | 7.5 | 252 |
| 35 | 6.7 | | | | | | | 30 | 181 |
| 36 | 7.2 | 2×5 | + | | | | | | |
| 37 | 5.0 | 2×5 | +++ | | | | | | |
| 38 | 5.8 | 2×3 | ++ | | | | | | |
| 39 | 6.2 | | | | | | | | |
| 40 | 5.8 | | | | | | | | |
| 41 | 5.0 | 2×5 | +++ | | | | | 15 | 120 |
| 42 | 5.6 | | | | | | | 57 | 155 |
| 43 | 5.2 | | | 2×5 | ++ | | | | |
| 44 | 4.8 | | | | | | | | |
| 45 | 6.1 | | | | | | | 15 | 223 |
| 46 | 5.3 | 4×0.5 | +++ | 4×0.5 | ++ | | | 15 | 228 |
| 47 | 4.0 | | | | | | | 62 | 146 |
| 48 | 6.4 | | | | | | | | |
| 49 | 6.1 | 2×5 | +++ | 2×5 | +++ | | | 20 | 140 |
| 50 | 6.6 | | | | | | | | |
| 51 | 5.8 | 2×5 | +++ | 2×5 | +++ | 3×20 | + | 330 | 360 |
| 52 | 4.3 | | | | | | | 74 | 280 |
| 53 | 5.8 | | | | | | | | |
| 54 | 6.3 | | | | | | | 25 | 155 |
| 55 | 5.9 | | | | | | | 30 | 212 |
| 56 | | | | | | | | 60 | 275 |
| 57 | | | | | | | | 60 | 266 |
| 58 | 5.2 | | | | | | | | |
| 59 | 5.1 | 2×5 | ++ | | | | | 30 | 198 |
| 60 | 5.9 | | | | | | | | |
| 61 | 6.8 | | | | | | | | |
| 62 | 6.0 | | | | | | | | |

TABLE I — Continued

| 1 | 2 | 3 Trypanocidal action | | 4 | | 5 Anti-babesial action | | 6 Anti-leukaemic action | |
|---|---|---|---|---|---|---|---|---|---|
| | | T. brucei | | T. congolense | | | | | |
| Product according to Ex. Nos.— | Tuberculo-static action | Dose, mg./kg. s.c. | Effect | Dose, mg./kg. s.c. | Effect | Dose, mg./kg. sc. | Effect | Dose i.p., mg./kg./day | Survival time, percent |
| 63 | 6.0 | 2×5 | + | | | | | 15 | 271 |
| 64 | 7.3 | 4×0.5 | +++ | 4×0.5 | ++ | | | | |
| 65 | 5.3 | 2×5 | + | | | | | 3.7 | 306 |
| 66 | 6.4 | | | | | | | 7.5 | 148 |
| 67 | 7.0 | | | | | | | | |
| 68 | 6.0 | | | | | | | | |
| 69 | 6.2 | 2×5 | + | 2×5 | + | | | | |
| 70 | 4.1 | | | | | | | 3.7 | 248 |
| 71 | 7.2 | | | | | | | 60 | 233 |
| 72 | 6.9 | 4×0.5 | +++ | 4×0.5 | ++ | 3×10 | + | 120 | 179 |
| 73 | 6.0 | | | | | | | 3.7 | 133 |
| 74 | 5.9 | 2×5 | ++ | 2×5 | ++ | | | 60 | 218 |
| 75 | 5.6 | 4×0.5 | +++ | 4×0.5 | +++ | | | 15 | 245 |
| 76 | 5.9 | 4×0.5 | +++ | 4×0.5 | ++ | | | 15 | 268 |
| 77 | 6.7 | 2×5 | +++ | 2×5 | + | | | 7.5 | 318 |
| 78 | 6.5 | | | | | | | 60 | 234 |
| 79 | 5.6 | | | | | | | 480 | 192 |
| 80 | 6.2 | | | | | | | 60 | 250 |
| 81 | 4.7 | | | | | | | 15 | 277 |
| 82 | 6.9 | 4×0.5 | +++ | 4×0.5 | +++ | | | 7.5 | 219 |
| 83 | 6.9 | | | | | | | 9 | 205 |
| 84 | 5.6 | | | | | | | 50 | 174 |
| 85 | 6.0 | | | | | | | 31 | 286 |
| 86 | 5.9 | | | | | | | 8 | 332 |
| 87 | 6.3 | | | | | 3×20 | + | 18 | 202 |
| 88 | 5.6 | | | | | | | 60 | 189 |
| 89 | 5.6 | | | | | | | 120 | 205 |
| 90 | | | | | | | | 6 | 269 |
| 91 | 7.0 | 4×0.5 | +++ | 4×0.5 | +++ | 3×20 | +++ | 7.5 | 171 |
| 92 | 6.6 | | | | | | | 60 | 196 |
| 93 | | | | | | | | 150 | 241 |
| 94 | 5.7 | | | | | | | 180 | 256 |
| 95 | | | | | | | | 45 | 291 |
| 96 | | | | | | | | 7.5 | 204 |
| 97 | 7.0 | | | | | | | 3.2 | 238 |
| 98 | 7.0 | | | | | | | | |
| 99 | 4.0 | | | | | | | 15 | 142 |
| 100 | 4.3 | | | | | | | 15 | 219 |
| 101 | 5.5 | | +++ | | ++ | | | | |
| 102 | 5.1 | | | | | | | | |
| 103 | 4.1 | | | | | | | | |
| 104 | 4.0 | | | | | | | | |
| 105 | 5.5 | | | | | | | | |
| 106 | 4.0 | | | | | | | | |
| 107 | 6.2 | | | | | | | | |
| 108 | 6.3 | | | | | | | 110 | 277 |
| 109 | 6.7 | | | | | | | | |
| 110 | 4.0 | | | | | | | | |
| 111 | 6.0 | | | | | | | 60 | 174 |
| 112 | 6.2 | | | | | | | | |
| 113 | 5.8 | | | | | | | 30 | 176 |
| 114 | 5.7 | | | | | | | | |
| 115 | 5.6 | | | | | | | | |
| 116 | 5.6 | | | | | | | | |
| 117 | 6.4 | | | | | | | 120 | 141 |
| 118 | 5.9 | | | | | | | | |
| 119 | 6.3 | | | | | | | | |
| 120 | 5.2 | | | | | | | | |
| 121 | 6.4 | | | | | | | | |
| 122 | 5.8 | | ++ | | | | | | |
| 123 | 4.7 | | | | | | | | |
| 124 | 5.8 | | | | | | | | |
| 125 | 6.9 | | | | | | | | |
| 126 | 4.7 | | | | | | | | |
| 127 | 5.3 | | | | | | | | |
| 128 | 6.5 | | | | | | | | |
| 129 | 6.9 | | | | | | | | |
| 130 | 5.1 | | | | | | | | |
| 131 | 6.1 | | | | | | | 20 | 155 |
| 132 | 6.6 | | | | | | | | |
| 133 | 5.5 | | | | | | | | |
| 134 | 5.5 | | | | | | | | |
| 135 | 6.3 | | | | | | | | |
| 136 | 5.5 | | + | | | | | | |
| 137 | 6.1 | | | | | | | | |
| 138 | 5.2 | | | | | | | | |
| 139 | 5.3 | | | | | | | | |
| 140 | 5.6 | | | | | | | | |
| 141 | 5.1 | | | | | | | | |
| 142 | 5.9 | | | | | | | | |
| 143 | 5.6 | | | | | | | | |
| 144 | 4.1 | | | | | | | | |
| 145 | 4.5 | | | | | | | | |
| 146 | 5.6 | | | | | | | | |
| 147 | 6.0 | | | | | | | | |
| 148 | 4.0 | | | | | | | 60 | 143 |
| 149 | 6.5 | | | | | | | | |
| 150 | 4.1 | | | | | | | | |
| 151 | 6.2 | | | | | | | | |
| 152 | 5.1 | | | | | | | | |
| 153 | 5.0 | | | | | | | | |
| 154 | 4.9 | | | | | | | 100 | 189 |
| 155 | 5.8 | | | | | | | | |
| 156 | 5.7 | | | | | | | 270 | 146 |
| 157 | 4.0 | | | | | | | | |
| 158 | 6.0 | | | | | | | | |
| 159 | 5.2 | | | | | | | | |
| 160 | 7.1 | | | | | | | | |
| 161 | 6.7 | | | | | | | | |
| 162 | 6.9 | | | | | | | | |
| 163 | 7.2 | | | | | | | | |
| 164 | 6.9 | | | | | | | | |

TABLE I — Continued

| 1 | 2 | 3 | | 4 | | 5 | | 6 | |
|---|---|---|---|---|---|---|---|---|---|
| | | Trypanocidal action | | | | | | Anti-leukaemic action | |
| | | T. brucei | | T. congolense | | Anti-babesial action | | | Survival |
| Product according to Ex. Nos.— | Tuberculo-static action | Dose, mg./kg. s.c. | Effect | Dose, mg./kg. s.c. | Effect | Dose, mg./kg. sc.. | Effect | Dose i.p., mg./kg./day | time, percent |
| 165 | 6.1 | | | | | | | | |
| 166 | 5.1 | | | | | | | | |
| 167 | 5.5 | | | | | | | | |
| 168 | 5.3 | | ++ | | | | | 30 | 177 |
| 169 | 4.0 | | | | | | | | |
| 170 | 5.4 | | ++ | | | | | 240 | 252 |
| 171 | 5.5 | | | | | | | | |
| 172 | 4.0 | | + | | | | | | |
| 173 | 4.0 | | | | | | | | |
| 174 | 4.5 | | | | | | | | |
| 175 | 4.0 | | | | | | | | |
| 176 | 5.6 | | | | | | | | |
| 177 | 4.0 | | | | | | | | |
| 178 | 5.6 | | | | | | | | |
| 179 | 4.5 | | ++ | | | | | 60 | 124 |
| 180 | 5.5 | | | | | | | | |

The compounds of this invention may be prepared by one of the following methods, which can be readily carried out by those having ordinary skill in the art:

The compounds of formula I contain at least one amide group (—NH—CO—) and/or at least one urea group (—NH—CO—NH—) and can thus be prepared from corresponding starting materials by processes known from peptide chemistry or for the manufacture of urea compounds.

Thus, compounds with two symmetrically arranged amide groups can be obtained by reacting an amine of formula II:

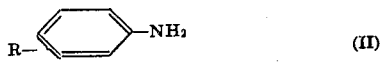

(II)

with either a dibasic acid of formula III:

HOOC—A—COOH   (III)

or a reactive derivative thereof, e.g. with an acid halide, a mixed acid anhydride, or with an ester of the acid, especially an activated ester. If instead of a uniform amine (II), a mixture of different kinds of amine is used, unsymmetrical compounds with different or differently located basic residues R are obtained.

The amine is suitably reacted with the acid or with the reactive derivative thereof by adding, for instance, the acid halide at room temperature to the amine or to a salt thereof in a nonaqueous solvent, preferably dimethylformamide, in the presence of an acid-binding agent such as pyridine. Another suitable procedure consists of stirring vigorously an aqueous solution of the amine or of a salt thereof in the presence of an acid-binding agent, e.g. sodium acetate, soda, sodium hydroxide, pyridine or the like, with a solution of the acid halide in a water-immiscible solvent such as benzene. For purification it is useful, for example, to convert the resultant hydrochloride into the base, to produce therefrom the water-soluble formiate or acetate, and if necessary to reprecipitate the hydrochloride from the aqueous solution, by adding chlorine ions.

The compounds according to formula I with one or two urea groups are obtained either by reacting two suitable amines, each of which carrying one of the two residues to be connected through the urea group, with carboxylic acid or with a reactive carboxylic acid derivative like phosgene, or by reacting an amine which carries one of the residues to be connected through the urea group, with an isocyanate which carries the other residue.

In practice, the isocyanate method is preferred and is carried out, in so far as two urea groups turn up in mirror-symmetrical arrangement in the molecule, either by reacting one or two amines of formula II with a diisocyanate of formula IV:

O=C=N—A—N=C=O   (IV)

or by reacting one or two isocyanates of the formula V:

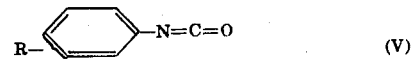

(V)

with a diamine of formula VI:

$H_2N$—A—$NH_2$   (VI).

In the reactions, a uniform product is obtained when uniform monoamines or monoisocyanates are used, while mixtures of two monoamines or monoisocyanates yield mixtures containing compounds according to formula I with dissimilar or differently located residues R.

The reaction known per se of amines with isocyanates, for which the starting materials can be, instead of the free amines, also their salts or reactive derivatives, is suitably carried out in a solvent, e.g. dimethylformamide or pyridine, while warming.

Compounds according to formula I can also be obtained by converting the cyano residue or residues, respectively, of a starting compound having one of the formula VII or VIII:

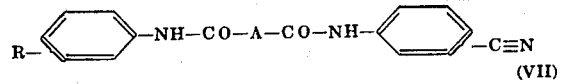

(VII)

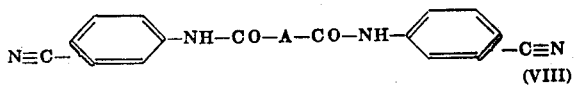

(VIII)

into the desired residue R. This reaction may be carried out, for instance, by treating the cyano compound first with hydrogen sulfide and then with the amine or diamine required for the formation of the desired R residue, for instance, with ethylenediamine if R should be the imidazolinyl residue. The treatment with hydrogen sulfide may be carried out in dimethylformamide solution in the presence of a strong base such as pyridine or triethylamine at room temperature. The thioamide obtained may be precipitated with water and heated without a solvent to about 110° C. with an excess of the required amine or diamine.

The cyano compounds (VII) or (VIII) can also first be treated with alcoholic hydrochloric acid and then with the required amine or diamine to yield the dibasic compound of formula I.

The compounds according to formula I can be obtained as the free bases or in the form of their addition salts with inorganic or organic acids. As therapeutically acceptable acid addition salts of the dibasic compounds according to formula I, mention can be made of the salts of sulfuric, hydrochloric, hydrobromic, hydriodic, phosphoric, formic, acetic, propionic, butyric, tartaric, maleic, oxalic, citric, salicylic, methane sulfonic, pamoic acids and the like.

The manufacture of soluble salts is suitably carried out by suspending the dibasic compound in water and adding the quantity of the desired acid required for neutralization, whereupon the base passes into solution. If desired, the salt can be obtained in solid form by evaporating or by adding acetone.

The bases or preferably their acid addition salts yield stable, sterilizable solutions or suspensions in water or other fluid carriers which are suitable for injection. The solutions can also contain other substances, but care should be taken that these are not precipitants. Thus, sodium chloride cannot be used for the production of isotonic solutions, if the chlorine ion would cause the compound to precipitate; in such cases, glucose, for example, is more suitable for this purpose.

For instance, an aqueous suspension comprising 10 percent (w./w.) of the product of example 8 is prepared. An amount of glucose sufficient to yield an isotonic solution is added and the suspension is heat-sterilized in a usual manner. Said suspension is administered to a mouse suffering from L–1210 leukemia by intraperitoneally injecting daily amounts comprising 10 mg./kg. of active ingredient, thus prolonging the survival time of the animal significantly. Other compounds can be administered in the same way, however, using different doses, in accordance with the data given in table I.

EXAMPLE 1

A 6.0 g. quantity of p-imidazolino-aniline dihydrochloride in a mixture of 80 ml. of dimethylformamide and 10 ml. of absolute pyridine are mixed with 2.3 g. of terephthalic acid chloride. The condensation product begins immediately to precipitate from the homogeneous solution. After allowing to stand for 4 hours, the reaction mixture is diluted with water and concentrated sodium hydroxide solution is added in order to bind the hydrochloric acid liberated during the reaction. The resultant organic base with the formula

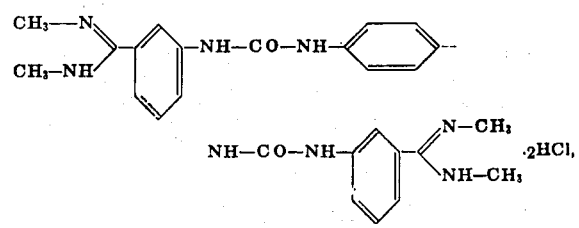

is drawn off and washed with water. There is obtained a 2.6 g. quantity of the base having a melting point of >350° C.

Dissolution of the base in hot, diluted acetic acid, purification with carbon and addition of diluted hydrochloric acid yield the hydrochloride salt which is drawn off and obtained, after washing with water and acetone and drying in vacuo, in a quantity of 2.7 g. with a melting point at >400° C. In similar manner, the diformate of melting point >400° C. and the diacetate of melting point >360° C. are obtained.

EXAMPLE 2

A 16.0 g. quantity of p-imidazolino-aniline is dissolved in diluted acetic acid, 40 ml. of a 50 percent solution of sodium acetate are added, and, while stirring vigorously, a benzene solution of 10.0 g. of terephthalic acid chloride is added drop by drop at room temperature. After removing the benzene in vacuo, the base is made to separate at high temperature by adding sodium hydroxide solution. The resultant base is drawn off and washed with water. The product obtained is identical with the base prepared according to example 1. By treating further as in example 1, it yields 10.2 g. of the dihydrochloride salt.

EXAMPLE 3

A 4.36 g. quantity of p-phenylene-diisocyanate (0.03 mol) and 14.04 g. of p-imidazolino-aniline dihydrochloride (0.06 mol) are heated in a mixture of 70 ml. of dimethylformamide and 20 ml. of absolute pyridine. For a short time complete dissolution occurs and then a crystalline precipitate appears. The latter is drawn off, washed with dimethylformamide and alcohol, suspended in concentrated ammonia solution and allowed to stand for 4 hours. The free base is drawn off and dissolved in hot diluted acetic acid. On addition of sodium chloride solution, the dihydrochloride salt having the formula

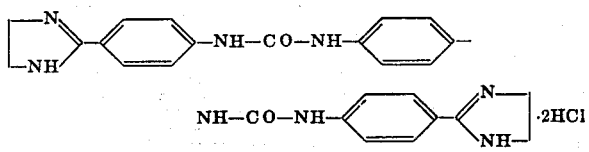

separates immediately and is removed by filtration, washed 5 times with water and dried in vacuo. The yield of the said salt amounts to 12.0 g., which is equivalent to 75 percent of the theoretical. The product melts at 325° C. undergoing decomposition.

EXAMPLE 4

A 2.0 g. quantity of p-phenylene-diisocyanate and 8.0 g. of m-(N,N'-dimethylamidino)-aniline dihydrochloride are dissolved in a mixture of 40 ml. of dimethylformamide and 10 ml. of absolute pyridine by shaking, then heated for 1 hour on a steam bath and allowed to stand overnight. Then the solution is filtered and 15 percent hydrochloric acid is added to the filtrate. This produces a precipitate which is drawn off, washed 3 times with diluted hydrochloric acid and twice with ether, and dried in vacuo. There are obtained 6.8 g. of the dihydrochloride salt of the formula

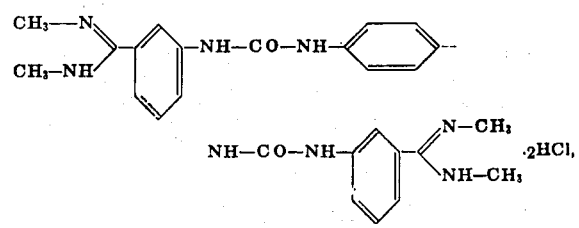

having a melting point of 265° C. (decomposition).

EXAMPLE 5

To a mixture of 10 millimol of p-phenyl-diacrylic acid and 22 millimol of p-aminophenyl-imidazoline dihydrochloride in a mixture of 100 ml. of dimethylformamide and 100 ml. of pyridine, 40 millimol of cyclohexyl-carbodiimide are added and the whole is warmed on a water bath until the separation of the product of reaction is terminated, which process lasts about 8 hours. Then the reaction mixture is filtered hot, and the solid remaining on the filter is washed with hot dimethylformamide and dried. There is obtained in a yield of 98 percent of the theoretical the dihydrochloride of formula

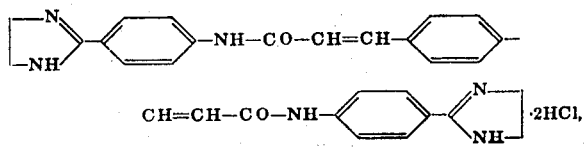

melting point 300° C.

EXAMPLE 6

Four g. of a dinitril of the formula

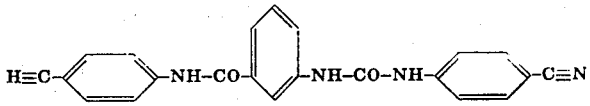

obtained by reacting m-aminobenzoyl-p'-cyananiline with p-cyanophenylisocyanate, are suspended in a mixture of 50 ml. of dimethylformamide and 10 ml. of piperidine. A moderate jet of hydrogen sulfide is bubbled through the suspension for 30 minutes. Then the reaction mixture is poured into water, filtered in order to separate the precipitated product and the latter is washed with water, diluted acetic acid and again with water. There are obtained 5 g. of a dithioamide of the formula

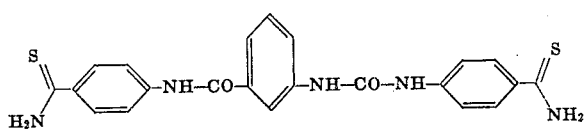

melting point 242° C. This intermediate product is mixed with 30 g. of ethylenediamine and heated for 2 hours on a steam bath. After cooling, it is diluted with an equal volume of ethanol and filtered in order to separate the precipitated solid. For the purpose of purification, this is dissolved in diluted acetic acid, treated on warming with charcoal, separated by filtration from the charcoal, and the clear filtrate is allowed to flow into an excess of 25 percent ammonia solution. Separate the precipitated product by filtration and wash with water. There are obtained 4.5 g. of a base of the formula

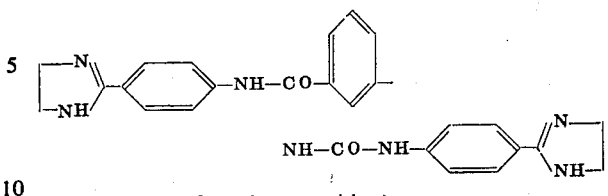

melting point 295° C. (decomposition).

In the same way as in the preceding examples, the products indicated in the following table II are obtained from the corresponding starting materials.

TABLE II

| Ex. No. | Product | Melting point |
|---|---|---|
| 7 | 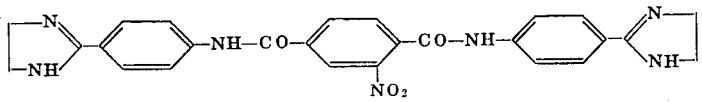 | Dihydrochloride 340° C.* |
| 8 | 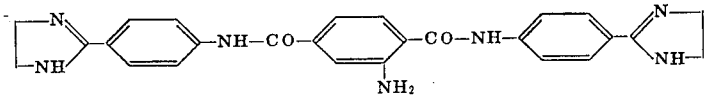 | Dihydrochloride 350° C.* |
| 9 | 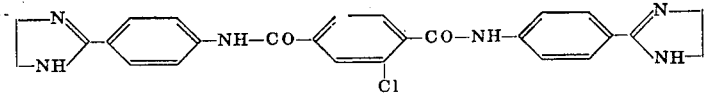 | Dihydrochloride 350° C.* |
| 10 | 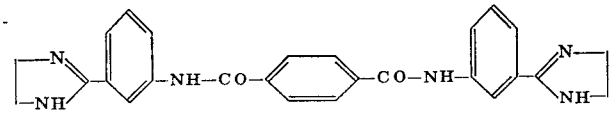 | Dihydrochloride 340° C.* |
| 11 | 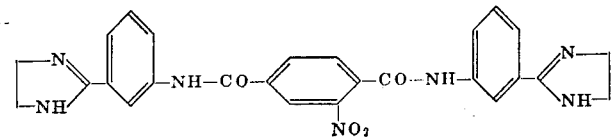 | Dehydrochloride 315° C.* |
| 12 | 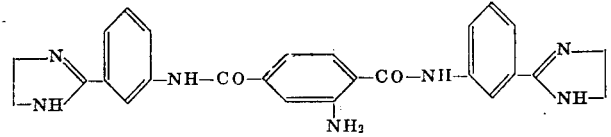 | Dihydrochloride 350° C.* |
| 13 | 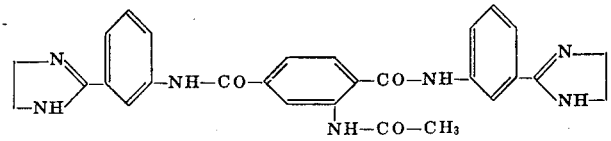 | Dihydrochloride 280° C.* |
| 14 | 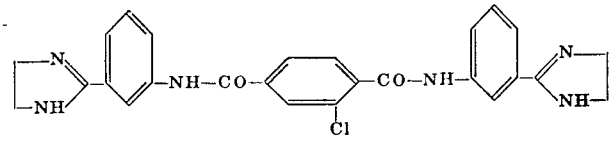 | Dihydrochloride 360° C.* |
| 15 | 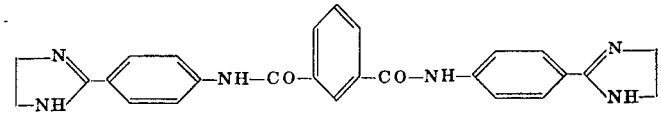 | Dihydrochloride 400° C.; diformate 360° C.* |
| 16 | 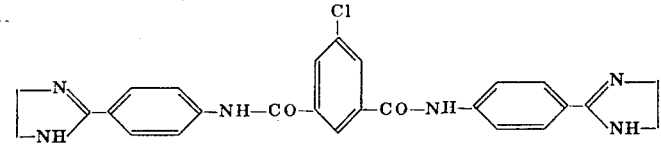 | Dihydrochloride 340° C. |

TABLE II—Continued

| Ex. No. | Product | Melting point |
|---|---|---|
| 17 | (structure: bis-amidinophenyl diamide with NO₂-substituted central benzene) | Dihydrochloride 296° C.* |
| 18 | (structure: bis-amidinophenyl diamide with NH₂-substituted central benzene) | Dihydrochloride 300° C.* |
| 19 | (structure: bis-amidinophenyl diamide with Br-substituted central benzene) | Diformate 260° C. |
| 20 | (structure: bis-amidinophenyl diamide with O–C₂H₅-substituted central benzene) | Dihydrochloride 300° C.* |
| 21 | (structure: bis-amidinophenyl diamide, unsubstituted central benzene) | Dihydrochloride 310° C. |
| 22 | (structure: bis-amidinophenyl diamide with Cl-substituted central benzene) | Dihydrochloride 260° C. |
| 23 | (structure: bis(imidazolinylamino-phenyl-NHCO)-benzene) | Dihydrochloride 320° C.* |
| 24 | (structure: bis(imidazolinylamino-phenyl-NHCO)-benzene, isomer) | Dihydrochloride 340° C.* |
| 25 | (structure: bis(imidazolinylamino-phenyl-NHCO)-benzene, NO₂-substituted) | Dihydrochloride 240° C. |
| 26 | H₂N(HN=)C–C₆H₄–NH–CO–C₆H₄–CO–NH–C₆H₄–C(=NH)NH₂ | Dihydrochloride 365° C.* |
| 27 | CH₃–N=C(NH₂)–C₆H₄–NH–CO–C₆H₄–CO–NH–C₆H₄–C(NH₂)=N–CH₃ | Dihydrochloride 365° C.* |
| 28 | CH₃–N=C(NH–CH₃)–C₆H₄–NH–CO–C₆H₄–CO–NH–C₆H₄–C(NH–CH₃)=N–CH₃ | Dihydrochloride 380° C.* |
| 29 | CH₃–N=C(NH–C₂H₅)–C₆H₄–NH–CO–C₆H₄–CO–NH–C₆H₄–C(NH–C₂H₅)=N–CH₃ | Dihydrochloride 348° C.* |

TABLE II—Continued

| Ex. No. | Product | Melting point |
|---|---|---|
| 30 | (structure: CH₃-N=/NH-C₃H₇ on aryl — NH-CO-C₆H₄-CO-NH — aryl =N-CH₃ / NH-C₃H₇) | Dihydrochloride 345° C.* |
| 31 | (structure with CH₃-N= and (CH₃)₂CH-NH groups on both aryls linked by -NH-CO-C₆H₄-CO-NH-) | Dihydrochloride 346° C. |
| 32 | (4-methylimidazoline groups on both aryls linked by -NH-CO-C₆H₄-CO-NH-) | Dihydrochloride from 340° C. brown coloration. |
| 33 | (tetrahydropyrimidine groups on both aryls linked by -NH-CO-C₆H₄-CO-NH-) | Dihydrochloride 410° C. |
| 34 | (CH₃-N= / CH₃-O-(CH₂)₃-NH on aryl — NH-CO-C₆H₄-CO-NH — aryl =N-CH₃ / NH-(CH₂)₃-O-CH₃) | Dihydrochloride 208–210° C. |
| 35 | (HN= / CH₃-NH on aryl — NH-CO-C₆H₃(Cl)-CO-NH — aryl =NH / NH-CH₃) | Dihydrochloride ~300° C.* |
| 36 | (CH₃-N= / CH₃-NH on aryl — NH-CO-C₆H₃(Cl)-CO-NH — aryl =N-CH₃ / NH-CH₃) | Dihydrochloride >300° C. |
| 37 | (HN= / H₂N on meta-aryl — NH-CO-C₆H₄-CO-NH — meta-aryl =NH / NH₂) | Dihydrochloride 375° C.* |
| 38 | (CH₃-N= / H₂N on meta-aryl — NH-CO-C₆H₄-CO-NH — meta-aryl =N-CH₃ / NH₂) | Dihydrochloride becomes vitreous at 230° C.; 260° C.* |
| 39 | (CH₃-N= / CH₃-NH on meta-aryl — NH-CO-C₆H₄-CO-NH — meta-aryl =N-CH₃ / NH-CH₃) | Dihydrochloride 320° C.* |
| 40 | (tetrahydropyrimidine groups on meta-aryls linked by -NH-CO-C₆H₄-CO-NH-) | Dihydrochloride 400° C.* |
| 41 | (HN= / H₂N on aryl — NH-CO-C₆H₄(meta)-CO-NH — aryl =NH / NH₂) | Dihydrochloride 330° C.* |
| 42 | (CH₃N= / CH₃NH on aryl — NH-CO-C₆H₄(meta)-CO-NH — aryl =N-CH₃ / NH-CH₃) | Dihydrochloride 355–362° C.* |
| 43 | (4-methylimidazoline groups on aryls linked by -NH-CO-C₆H₄(meta)-CO-NH-) | Dihydrochloride (at 265° C. vitreous). |

TABLE II—Continued

| Ex. No. | Product | Melting point |
|---|---|---|
| 44 | (structure: bis-amidinophenyl terephthalamide) | Dihydrochloride 242° C. |
| 45 | (structure: bis(N,N'-dimethylamidino)phenyl terephthalamide) | Dihydrochloride 140°/220° C.* |
| 46 | (structure: bis-imidazolinyl-phenyl pyridine-3,5-dicarboxamide) | Dihydrochloride ~310° C.* |
| 47 | (structure: bis-imidazolinyl-phenyl pyridine-2,6-dicarboxamide) | Dihydrochloride ~315° C.* |
| 48 | (structure: bis-imidazolinylamino triphenyl diurea) | Dihydrochloride 362° C.* |
| 49 | (structure: bis(methylimidazolinyl)triphenyl diurea) | Dihydrochloride 290° C.* |
| 50 | (structure: bis(N,N'-dimethylamidino)triphenyl diurea) | Dihydrochloride >300 C.* |
| 51 | (structure: bis-tetrahydropyrimidinyl triphenyl diurea) | Dihydrochloride 365° C.* |
| 52 | (structure: bis-imidazolinyl-(meta)phenyl triphenyl diurea) | Dihydrochloride 255° C.* |
| 53 | (structure: bis-imidazolinylphenyl-(meta-phenylene) diurea) | Dihydrochloride 285° C.* |
| 54 | (structure: bis(N,N'-dimethylamidino)phenyl-(meta-phenylene) diurea) | Dihydrochloride 220° C.* |
| 55 | (structure: bis-imidazolinyl-(meta)phenyl-(para-phenylene) diurea) | Dihydrochloride 275° C.* |
| 56 | (structure: bis-imidazolinylphenyl 2-methoxy-terephthalamide) | Base 330° C. |
| 57 | (structure: bis-imidazolinylphenyl 5-methoxy-isophthalamide) | Base 292–296° C. |

TABLE II—Continued

| Ex. No. | Product | Melting point |
|---|---|---|
| 58 | (structure with OCH₃ substituent on central benzene) | Base 330° C.* |
| 59 | (structure with OCH₃ substituent on central benzene) | Base >300° C.* |
| 60 | (structure with NO₂ substituent on central benzene) | Base 305–308° C.* |
| 61 | (N,N'-dimethylamidine structure with NO₂ substituent) | Dihydrochloride hydrate about 340° C. |
| 62 | (N,N'-dimethylamidine structure with OCH₃ substituent) | Dihydrochloride hydrate about 320° C. |
| 63 | (structure with Cl substituent) | Dihydrochloride 288° C. |
| 64 | (structure with NH–CO–CH₃ substituent) | Dihydrochloride 280° C.* |
| 65 | (structure with Br substituent) | Dihydrochloride 260° C.* |
| 66 | (tetrahydropyrimidine structure with NH₂ substituent) | Dihydrochloride 330° C. |
| 67 | (guanidine structure with NO₂ substituent) | Dihydrochloride hydrate about 360° C. |
| 68 | (guanidine structure with OCH₃ substituent) | Dihydrate 242–246° C. |
| 69 | (guanidine structure with CH₃ substituent) | Hydrate 256° C. |

TABLE II—Continued

| Ex. No. | Product | Melting point |
|---|---|---|
| 70 | (imidazoline)–C₆H₄–NH–CO–C₆H₄–CH=CH–CO–NH–C₆H₄–(imidazoline) | Dihydrochloride hydrate >300° C. |
| 71 | (CH₃–N=C(NHCH₃))–C₆H₄–NH–CO–C₆H₄–CH=CH–CO–NH–C₆H₄–(C(=NCH₃)NHCH₃) | Dihydrochloride hydrate >300° C. |
| 72 | (CH₃–N=C(NH₂))–C₆H₄–NH–CO–C₆H₄–CH=CH–CO–NH–C₆H₄–(C(=NCH₃)NH₂) | Dihydrochloride sesquihydrate >300° C. |
| 73 | (CH₃–N=C(NH₂))–C₆H₄–NH–CO–CH=CH–C₆H₄–CH=CH–CO–NH–C₆H₄–(C(=NCH₃)NH₂) | Dihydrochloride dihydrate >300° C. |
| 74 | (CH₃–N=C(NHCH₃))–C₆H₄–NH–CO–CH=CH–C₆H₄–CH=CH–CO–NH–C₆H₄–(C(=NCH₃)NHCH₃) | Dihydrochloride >300° C. |
| 75 | (imidazoline)–C₆H₄–NH–CO–C₆H₄–NH–CO–NH–C₆H₄–(imidazoline) | Dihydrochloride 320–330° C.* |
| 76 | (imidazoline)–C₆H₄–NH–CO–C₆H₄–NH–CO–NH–C₆H₄–(imidazoline) | Dihydrochloride 295° C.* |
| 77 | (N-methyl-imidazoline)–C₆H₄–NH–CO–C₆H₄–CO–NH–C₆H₄–(N-methyl-imidazoline) | Dihydrochloride 298° C.* |
| 78 | (4-methyl-imidazoline)–C₆H₄–NH–CO–C₆H₃(NH₂)–CO–NH–C₆H₄–(4-methyl-imidazoline) | Dihydrochloride 365° C.* |
| 79 | (N-methyl-imidazoline)–C₆H₄–NH–CO–C₆H₄–CO–NH–C₆H₄–(N-methyl-imidazoline) | Dihydrochloride 275° C.* |
| 80 | (imidazoline)–C₆H₄–NH–CO–NH–C₆H₃(CH₃)–NH–CO–NH–C₆H₄–(imidazoline) | Dihydrochloride 255° C.* |
| 81 | (imidazoline)–C₆H₄–NH–CO–NH–C₆H₃(CO–N(CH₃)₂)–NH–CO–NH–C₆H₄–(imidazoline) | Dihydrochloride 292° C.* |
| 82 | (4-methyl-imidazoline)–C₆H₄–NH–CO–C₆H₄–NH–CO–NH–C₆H₄–(4-methyl-imidazoline) | Dihydrochloride 290° C.* |
| 83 | (tetrahydropyrimidine)–C₆H₄–NH–CO–C₆H₄–NH–CO–NH–C₆H₄–(tetrahydropyrimidine) | Dihydrochloride 352° C.* |
| 84 | (imidazoline)–C₆H₄–NH–CO–NH–C₆H₃(CH₃)–NH–CO–NH–C₆H₄–(imidazoline) | Dihydrochloride 280° C.* |

TABLE II—Continued

| Ex. No. | Product | Melting point |
|---|---|---|
| 85 | (imidazoline)-C₆H₄-NH-CO-NH-C₆H₄-NH-CO-NH-C₆H₄-(imidazoline) | Dihydrochloride 295° C.* |
| 86 | (imidazoline)-C₆H₄-NH-CO-NH-C₆H₄-NH-CO-NH-C₆H₄-(imidazoline) | Dihydrochloride 245° C.* |
| 87 | (imidazoline)-C₆H₄-NH-CO-NH-C₆H₄-NH-CO-NH-C₆H₄-(imidazoline) | Dihydrochloride 255° C.* |
| 88 | (imidazoline)-C₆H₄-NH-CO-NH-C₆H₄-NH-CO-NH-C₆H₄-(imidazoline) | Dihydrochloride 268° C.* |
| 89 | (imidazoline)-C₆H₄-NH-CO-CH=CH-C₆H₄-CH=CH-CO-NH-C₆H₄-(imidazoline) | Dihydrochloride 300° C.* |
| 90 | $H_3C-NH-C(=NH)-C_6H_4-NH-CO-NH-C_6H_4-NH-CO-NH-C_6H_4-C(=NH)-NH-CH_3$ | Dihydrochloride 310° C.* |
| 91 | $H_3CO-(CH_2)_3-NH-C(=NH)-C_6H_4-NH-CO-C_6H_4-CO-NH-C_6H_4-C(=NH)-NH-(CH_2)_3-OCH_3$ | Dihydrochloride 308° C.* |
| 92 | $H_3CO-(CH_2)_3-NH-C(=NH)-C_6H_4-NH-CO-C_6H_3(Cl)-CO-NH-C_6H_4-C(=NH)-NH-(CH_2)_3-OCH_3$ | Dihydrochloride 280° C.* |
| 93 | (imidazoline)-C₆H₄-NH-CO-C₆H₃(CH₃)-CO-NH-C₆H₄-(imidazoline) | Base 290–295° C. |
| 94 | (imidazoline)-C₆H₄-NH-CO-C₆H₃(F)-CO-NH-C₆H₄-(imidazoline) | Base >300° C.* |
| 95 | (imidazoline)-C₆H₄-NH-CO-C₆H₃(S-CH₃)-CO-NH-C₆H₄-(imidazoline) | Base 287° C.* |
| 96 | (imidazoline)-C₆H₄-NH-CO-C₆H₃(F)-CO-NH-C₆H₄-(imidazoline) | Base >360° C.* |
| 97 | $H_5C_2-NH-C(=N-C_2H_5)-C_6H_4-NH-CO-C_6H_4-CO-NH-C_6H_4-C(=N-C_2H_5)-NH-C_2H_5$ | Dihydrochloride 340° C.* |
| 98 | $H_3C-NH-C(=N-CH_3)-NH-C_6H_4-NH-CO-C_6H_4-CO-NH-C_6H_4-NH-C(=N-CH_3)-NH-CH_3$ | Dihydrochloride |

*With decomposition.

EXAMPLE 99

A 12 g. quantity of the condensation product of p-imidazolinoaniline and p-amino-benzoic acid of the formula

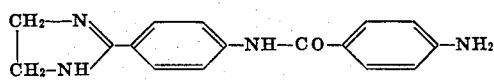

in the form of the acetate are dissolved in 100 ml. of dimethylformamide. After adding 50 g. of sodium acetate, phosgene is passed in, while stirring, until the diazo reaction is negative. The resultant basic compound of the formula

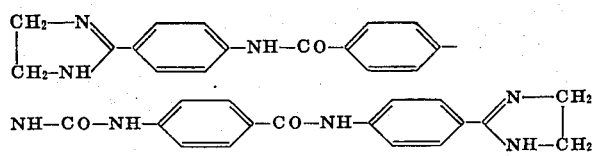

is precipitated by adding sodium hydroxide solution, drawn off and washed with water.

The free base is dissolved hot in 50 percent ethanol in the presence of the necessary quantity of glacial acetic acid. After purification of the solution with carbon, ethanolic hydrochloric acid is added, whereupon the dihydrochloride salt of the base separates and is then drawn off, washed with ethanol and dried in vacuo. The said salt is obtained in a quantity of 7.0 g. with a melting point of 360° C. (decomposition).

EXAMPLE 100

A 20 g. quantity of p-aminophenylimidazoline dihydrochloride, suspended in a mixture of 100 ml. of absolute pyridine and 100 ml. of dimethylformamide, is mixed with 10 g. of phenylisothiocyanate-3-carboxylic acid chloride and warmed, after the reaction has subsided, for 2 hours on a steam bath. After cooling, the product is drawn off and when still moist dissolved in 300 ml. of hot water, filtered until clear, mixed with a little 2 N hydrochloric acid, allowed to cool, and filtered. After drying, there are obtained 13.5 g. of a pale yellow product of the formula

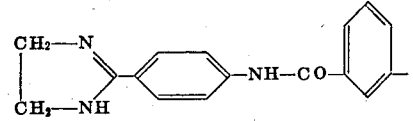

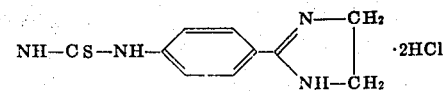

with a melting point at 275°–280° C.

EXAMPLE 101

A 10 g. quantity of 4′,4″-bis-(imidazolinyl-2-)-therephthalanilide dihydrochloride, suspended in 130 ml. of absolute pyridine, is boiled with 9 g. of phosphorus pentasulphide at reflux for 4 hours. After cooling, the whole is poured over ice water and allowed to stand overnight. The powdery yellow product is drawn off, washed with hot water, and dried. There are obtained 8.5 g. of monophosphate of the dithio compound of the formula

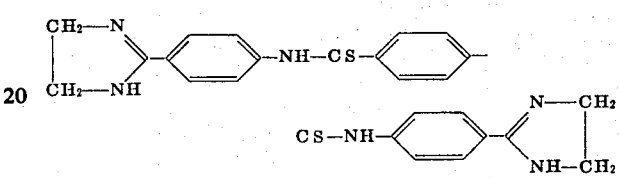

with a melting point at 330° C. (decomposition).

By triturating with cold 2 N sodium hydroxide solution, the free base is obtained therefrom.

EXAMPLE 102

A 32 g. quantity of p-aminophenylimidazoline is dissolved in 500 ml. of a 1:1 mixture of acetone and water, and while stirring, 7.5 ml. of thiophosgen are added drop by drop at room temperature. After stirring further for 1½ hours, the resultant yellow precipitate is drawn off. The still moist product is dissolved in 200 ml. of hot water, filtered until clear, and an excess of 2 N soda solution is added while warming. The whole is allowed to cool, and the product is drawn off and washed with water. There are obtained 15 g. of a yellow product having the formula

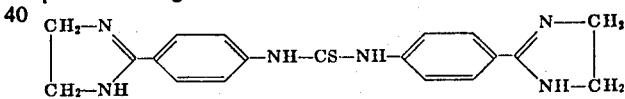

with a melting point at 173°–175° C.

By the same processes as in the preceding examples, there are also obtained the products listed in the following table IIa.

TABLE IIa

| Ex. No. | Product | Melting point |
|---|---|---|
| 103 | (structure) | Dihydrochloride 360° C.* |
| 104 | (structure) | Dihydrochloride 370° C.* |
| 105 | (structure) | Tetrahydrochloride 320° C.* |
| 106 | (structure) | Tetrahydrochloride 290° C.* |

TABLE IIa—Continued

| Ex. No. | Product | Melting point |
|---|---|---|
| 107 | (structure: imidazoline–C6H4–NH–CO–[2,5-Cl2-C6H2]–CO–NH–C6H4–imidazoline) | Dihydrochloride 350° C.* |
| 108 | (structure: [3-Cl-4-imidazoline-C6H3]–NH–CO–C6H4–CO–NH–[3-Cl-4-imidazoline-C6H3]) | Dihydrochloride 295° C.* |
| 109 | (structure: [3-CH3-4-imidazoline-C6H3]–NH–CO–C6H4–CO–NH–[3-CH3-4-imidazoline-C6H3]) | Diformate 380° C.* |
| 110 | (structure: 3-imidazoline-C6H4–NH–CO–C6H4–CO–NH–C6H4-3-imidazoline) | Dihydrochloride 350° C.* |
| 111 | (structure: [3-Cl-4-imidazoline-C6H3]–NH–CO–C6H4–CO–NH–[3-Cl-4-imidazoline-C6H3]) | Dihydrochloride 255° C. |
| 112 | (structure: imidazoline–C6H4–NH–CO–naphthalene–CO–NH–C6H4–imidazoline) | Dihydrochloride 350° C.* |
| 113 | (structure: imidazoline–C6H4–NH–CO–naphthalene–CO–NH–C6H4–imidazoline) | Dihydrochloride 345° C.* |
| 114 | (structure: imidazoline–C6H4–NH–CO–naphthalene–CO–NH–C6H4–imidazoline) | Dihydrochloride 360° C.* |
| 115 | (structure: 3-imidazoline-C6H4–NH–CO–naphthalene–CO–NH–C6H4-3-imidazoline) | Dihydrochloride 340° C.* |
| 116 | (structure: imidazoline–C6H4–NH–CO–[2,6-naphthalene]–CO–NH–C6H4–imidazoline) | Dihydrochloride 282° C. |
| 117 | (structure: imidazoline–C6H4–NH–CO–naphthalene–CO–NH–C6H4–imidazoline) | Dihydrochloride 365° C.* |
| 118 | (structure: imidazoline–C6H4–NH–CO–naphthalene–CO–NH–C6H4–imidazoline) | Dihydrochloride 360° C.* |
| 119 | (structure: 3-imidazoline-C6H4–NH–CO–naphthalene–CO–NH–C6H4-3-imidazoline) | Dihydrochloride 240° C. |

TABLE IIa—Continued

| Ex. No. | Product | Melting point |
|---|---|---|
| 120 | | Dihydrochloride 390° C.* |
| 121 | | Dihydrochloride 330° C.* |
| 122 | | Dihydrochloride 320° C.* |
| 123 | | Dihydrochloride 210° C. |
| 124 | | Tetrahydrochloride 250/285° C. |
| 125 | | Dihydrochloride 325° C. |
| 126 | | Dihydrochloride 340° C.* |
| 127 | | Base vitrified at 130° C. |
| 128 | | Dihydrochloride 360° C.* |
| 129 | | Base 270° C.* |
| 130 | | Dihydrochloride 308–312° C. |
| 131 | | Dihydrochloride 310° C. |
| 132 | | Dihydrochloride 325° C.* |

TABLE IIa—Continued

| Ex. No. | Product | Melting point |
|---|---|---|
| 133 | [structure: H₂N-C(=NH)-CH₂-C₆H₄-NH-CO-C₆H₄-CO-NH-C₆H₄-CH₂-C(=NH)-NH₂] | Dihydrochloride 210° C. |
| 134 | [structure: CH₃-N=C(NH₂)-CH₂-C₆H₄-NH-CO-C₆H₄-CO-NH-C₆H₄-CH₂-C(NH₂)=N-CH₃] | Base 260° C.* |
| 135 | [structure: CH₃-N=C(NH-C₄H₉)-C₆H₄-NH-CO-NH-C₆H₄-NH-CO-NH-C₆H₄-C(NH-C₄H₉)=N-CH₃] | Dihydrochloride 295° C.* |
| 136 | [structure: (CH₃)₂CH-N=C(NH-CH(CH₃)₂)-C₆H₄-NH-CO-NH-C₆H₄-NH-CO-NH-C₆H₄-C(NH-CH(CH₃)₂)=N-CH(CH₃)₂] | Dihydrochloride 245° C.* |
| 137 | [structure: C₆H₅-N=C(NH-CH₃)-C₆H₄-NH-CO-NH-C₆H₄-NH-CO-NH-C₆H₄-C(NH-CH₃)=N-C₆H₅] | Dihydrochloride 235° C.* |
| 138 | [structure: bis-imidazoline substituted on C₆H₃, linked via NH-CO-NH-C₆H₄-NH-CO-NH] | Base 220° C.* |
| 139 | [structure: bis-imidazoline substituted on C₆H₃, linked via NH-CO-NH-C₆H₄-NH-CO-NH] | Tetrahydrochloride 295° C.* |
| 140 | [structure: imidazoline-C₆H₄-NH-CO-NH-(3,3'-dimethylbiphenyl)-NH-CO-NH-C₆H₄-imidazoline] | Base 250° C.* |
| 141 | [structure: imidazoline-C₆H₄-NH-CO-NH-(3,3'-dimethoxybiphenyl)-NH-CO-NH-C₆H₄-imidazoline] | Dihydrochloride 302° C. |
| 142 | [structure: imidazoline-C₆H₄-NH-CO-NH-(2,2'-dimethylbiphenyl)-NH-CO-NH-C₆H₄-imidazoline] | Base 250° C.* |
| 143 | [structure: imidazoline-C₆H₄-NH-CO-NH-(biphenyl)-NH-CO-NH-C₆H₄-imidazoline] | Base 195° C.* |
| 144 | [structure: imidazoline-C₆H₄-NH-CO-C₆H₃(CO-NH-C₆H₄-imidazoline)(CO-NH-C₆H₄-imidazoline)] | Trihydrochloride 300° C. |

TABLE IIa—Continued

| Ex. No. | Product | Melting point |
|---|---|---|
| 145 | (structure) | Trihydrochloride 285° C. |
| 146 | (structure) | Diformate 400° C.* |
| 147 | (structure) | Diformate 395° C.* |
| 148 | (structure) | Dihydrochloride 360° C.* |
| 149 | (structure) | Dihydrochloride 300° C.* |
| 150 | (structure) | Do.* |
| 151 | (structure) | Dihydrochloride 280° C.* |
| 152 | (structure) | Tetrahydrochloride 330° C.* |
| 153 | (structure) | Tetrahydrochloride 360° C.* |
| 154 | (structure) | Base ~370° C.* |
| 155 | (structure) | Base 380° C. |

TABLE IIa—Continued

| Ex. No. | Product | Melting point |
|---|---|---|
| 156 | (structure) | Tetrahydrochloride 300° C.* |
| 157 | (structure) | Base ~330° C.* |
| 158 | (structure) | Base 300° C.* |
| 159 | (structure) | Dihydrochloride 313–317° C. |
| 160 | (structure) | Dihydrate 250° C. |
| 161 | (structure) | Dihydrochloride hydrate 315° C.* |
| 162 | (structure) | Dihydrochloride hydrate 318° C. |
| 163 | (structure) | Dihydrochloride hydrate 335° C. |
| 164 | (structure) | Dihydrochloride hydrate 330° C. |
| 165 | (structure) | Dihydrochloride hydrate 270° C. |
| 166 | (structure) | Dihydrochloride 271° C. |
| 167 | (structure) | Dihydrochloride hydrate 320° C. |

TABLE IIa—Continued

| Ex. No. | Product | Melting point |
|---|---|---|
| 168 | [imidazoline]-C6H4-NH-CO-CH=CH-CO-NH-C6H4-[imidazoline] | Dihydrochloride 350° C.* |
| 169 | [imidazoline]-C6H4-NH-CO-CH=CH-CO-NH-C6H4-[imidazoline] (meta) | Dihydrochloride 265° C.* |
| 170 | [imidazoline]-C6H4-NH-CO-[thiophene]-CO-NH-C6H4-[imidazoline] | Dihydrochloride >310° C.* |
| 171 | [imidazoline]-C6H4-NH-CO-[furan]-CO-NH-C6H4-[imidazoline] | Dihydrochloride >300° C.* |
| 172 | [CH2-N/CH2/CH2-NH]-C(=)-C6H4-NH-CO-NH-C6H4-C(=)-[N-CH2/CH2/NH-CH3] | Base 240° C.* |
| 173 | [imidazoline]-C6H4-NH-CO-NH-C6H3(COOH)-NH-CO-NH-C6H4-[imidazoline] | Dihydrochloride 265–270° C. |
| 174 | [imidazoline]-C6H4-NH-CO-NH-C6H3(CO-NH-C6H5)-NH-CO-NH-C6H4-[imidazoline] | Dihydrochloride 284° C. |
| 175 | [imidazoline]-C6H4-NH-CO-NH-C6H3(COOH)-NH-CO-NH-C6H4-[imidazoline] (meta) | Dihydrochloride 240–250° C. |
| 176 | [imidazoline]-C6H4-NH-CO-NH-C6H3(CO-NH-C6H5)-NH-CO-NH-C6H4-[imidazoline] (meta) | Dihydrochloride 255° C. |
| 177 | [imidazoline]-C6H4-NH-CO-NH-[pyridine]-NH-CO-NH-C6H4-[imidazoline] | Dihydrochloride 245° C.* |
| 178 | [imidazoline]-C6H4-NH-CO-NH-[pyridine]-NH-CO-NH-C6H4-[imidazoline] | Dihydrochloride 250° C.* |
| 179 | CH3-NH-C(=NH)-C6H4-NH-CS-NH-C6H4-NH-CS-NH-C6H4-C(=NH)-NH-CH3 | Base 190° C. |
| 180 | [imidazoline]-C6H4-NH-CO-CO-NH-C6H4-[imidazoline] | Base 350° C.* |

We claim:
1. The compound of the formula:

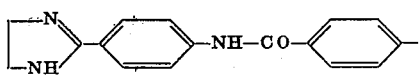

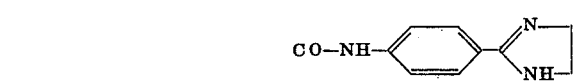

2. A therapeutically acceptable acid addition salt of a compound of the formula:

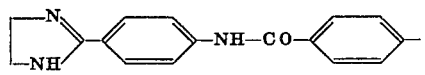

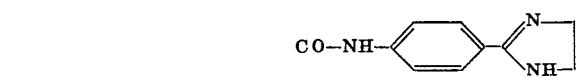

3. The compound of the formula:

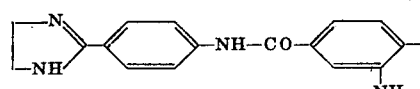

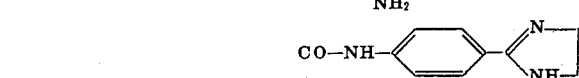

4. A therapeutically acceptable acid addition salt of a compound of the formula:

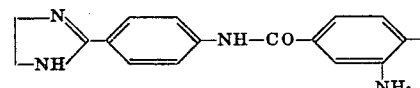

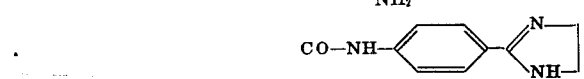

5. The compound of the formula:

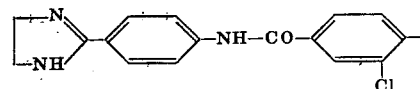

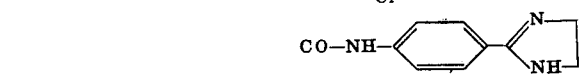

6. A therapeutically acceptable acid addition salt of a compound of the formula:

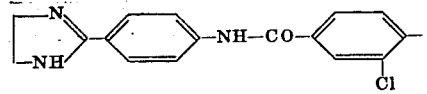

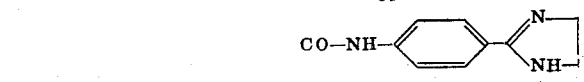

7. The compound of the formula:

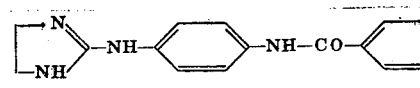

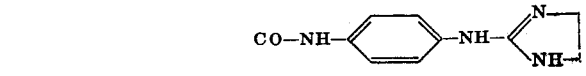

8. A therapeutically acceptable acid addition salt of a compound of the formula:

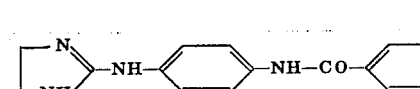

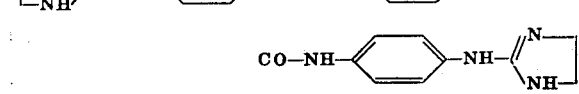

9. The compound of the formula:

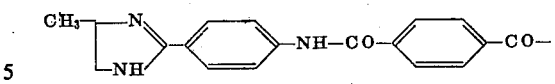

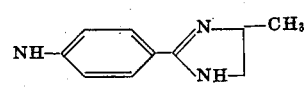

10. A therapeutically acceptable acid addition salt of a compound of the formula:

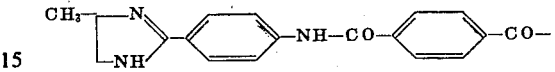

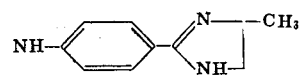

11. The compound of the formula:

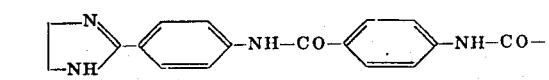

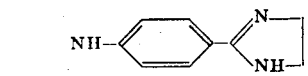

12. A therapeutically acceptable acid addition salt of a compound of the formula:

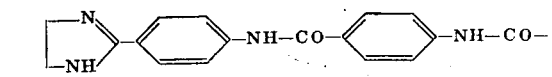

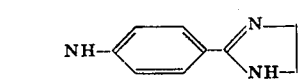

13. The compound of the formula:

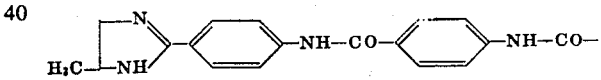

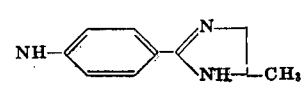

14. A therapeutically acceptable acid addition salt of a compound of the formula:

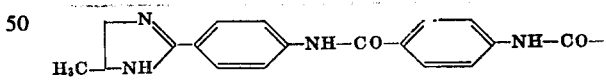

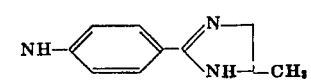

15. The compound of the formula:

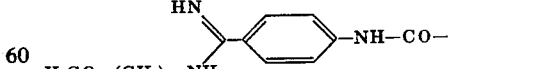

16. A therapeutically acceptable acid addition salt of a compound of the formula:

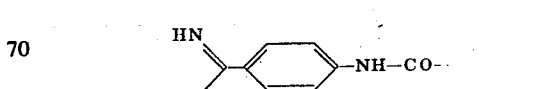

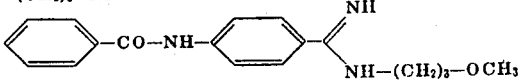

17. A chemical compound of the class consisting of (a) basic compounds of the formula selected from the group consisting of:

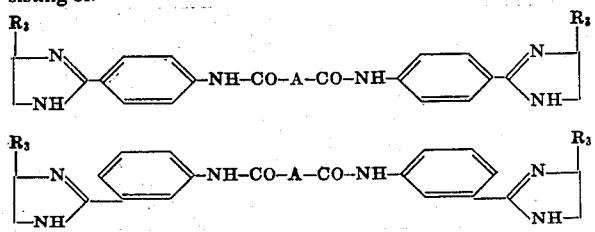

wherein A is a member the class consisting of m- and p-phenylene, $R_1$-substituted m- and p-phenylene, m- and p-phenyleneamino, m- and p-phenylenediamino, and $R_1$-substituted m- and p-phenylenediamino, $R_1$ denoting a substituent of the group consisting of halogen, amino, nitro, hydroxy, lower alkyl, lower alkoxy, lower alkylthio, lower alkanoylamino, and lower mono and dialkylamino-carbonyl, and $R_3$ being the same or different members of the group consisting of hydrogen, methyl, and ethyl; and (b) therapeutically acceptable acid addition salts of (a).

* * * * *